Nov. 13, 1956  M. A. KNIGHT  2,770,666
STORAGE BATTERY WITH VENT PLUG
Filed May 11, 1955

INVENTOR
MILTON A. KNIGHT
BY
ATTORNEYS

United States Patent Office 2,770,666
Patented Nov. 13, 1956

2,770,666
STORAGE BATTERY WITH VENT PLUG

Milton A. Knight, Centreville, Va.

Application May 11, 1955, Serial No. 507,755

9 Claims. (Cl. 136—178)

(Granted under Title 35, U. S. Code (1952), sec. 266)

The invention described herein may be manufactured and used by or for the Government of the United States of America for governmental purposes without the payment of any royalties thereon or therefor.

This invention relates to containers such as aircraft storage batteries which are frequently subjected to tilting during flight operation or maneuvers.

More particularly the invention contemplates a means for controlling a vent for these batteries. The means provided is responsive to the tilting of the battery from its normal horizontal position to close the vent and thus prevent the loss of liquid electrolyte. It is also effective to open the vent when the battery re-assumes its horizontal position even though substantial gas pressure has built up within the storage battery body portion during the period the vent remained closed.

Considerable difficulty has been experienced in providing for this latter function because of the extended periods of time aircraft batteries assume a non-upright position during climb and other modern aircraft maneuvers. Gas generated during these periods resists or precludes the opening movement of the usual vent control valves with the result that pressure builds up within the battery to an extent that the battery may explode. Present design of aircraft batteries using a permanent hard seal compound precludes the use of safety valves or localized weak portions.

It will be understood then that it is essential to provide a gas vent which will automatically be closed due to tilting of the battery and which will re-open the vent for gas escape against high gas pressure where the battery resumes a horizontal position. This has been a problem of long standing.

Prior efforts to acomplish these objectives include the use of a weight and valve assembly in a vent plug. In the main, these prior attempts have included the use of a valve stem having an enlargement at its bottom end. In some instances a soft rubber or equivalent disc surrounded the valve stem above the enlargement and in others the enlargement seated directly on the bottom of the plug body which constituted the valve seat. United States Letters Patent Nos. 2,306,974, 2,405,736, and 2,619,102 are illustrative of these prior suggestions.

The use of soft rubber discs has certain disadvantages in that the discs are susceptible to distortion from the other parts and gas pressures during operation. Further, for various reasons, they are sometimes very difficult to dislodge from their closed position. The distortion of the soft rubber disc of some designs causes the disc to assume a cone-like configuration and results in the dual valve of these prior constructions acting as a single valve under high pressure conditions. Single valves are operative only over a limited range.

According to the present improvements, there is provided a dual valve construction which may open the vent in stages and which is operative under conditions of high gas pressure within the battery or other container. After the gas pressure drops, the vent is further or fully opened. When the pressure is initially low, the vent will be fully opened by a single movement of the valve. Preferred embodiments of the invention contemplate the use of a small enlargement at the end of the valve stem to facilitate partial opening of the vent and yet adequately support a larger rigid or semi-rigid washer-type disc which will retain a liquid seal at its outer edge when the vent passage is fully closed. Movement of the valve stem and partial venting under conditions of high gas pressure are successfully effected with the present invention. The partial venting occurs in a manner to facilitate subsequent complete opening of the vent.

An important feature of the present invention lies in the extreme facility with which the battery or other container is partially vented. It is further characterized by the fact that the small enlarged portion at the bottom of the valve stem does not effect material distortion or movement of the outer edge of the non-flexible washer-type disc portion of the valve or force the disc hard against the valve seat to cause the disc to attach itself thereto. Plugs in accordance with these improvements will function properly under container pressures in excess of 60 cm. of mercury as compared to about 15 cm. of mercury for some plugs presently in use. A pressure of 60 cm. of mercury closely approximates 11.5 pounds per square inch. The most recent military specifications require a valve operative with battery cell pressures of 50 cm. of mercury above atmospheric pressure.

It is an object of this invention to provide a container, such as an aircraft storage battery, with a vent plug which is operative without failure or damage to the container over a wide range of operating conditions so that hard sealing compounds may be used with safety.

Another object is to provide such a valve controlled vent plug including a dual valve which is operable in predetermined stages or as a unit under the influence of the position taken by the container to which the plug is secured.

Another object is to provide a dual valve for vent plugs in which a valve stem has a reduced portion and a slightly enlarged high pressure valve portion near one end which centrally controls and supports a larger low pressure rigid or semi-rigid disc valve which is not distorted by the operating forces during use of the plug.

Another object is to provide the above described valves with a flexible valve stem which is laterally or pivotally movable without unseating the valve.

These and other objects of invention will be manifest from a consideration of the following description, claims, and drawings in which:

Figure 1:
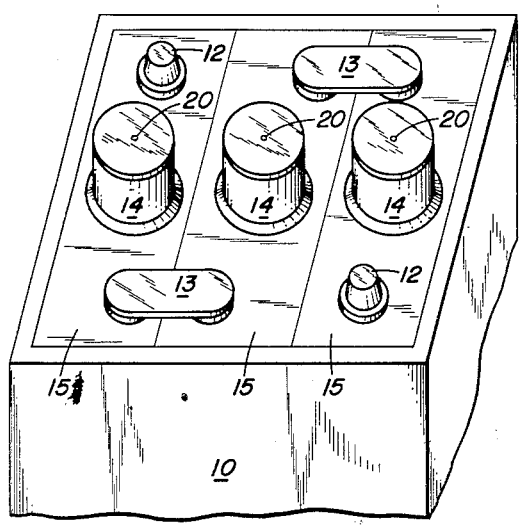
Fig. 1 is a view of the upper part of a battery having a permanent hard sealing compound, and each cell of which is provided with a vent plug of the type described herein. The battery has the usual cell connectors and terminal posts.
Figure 2:
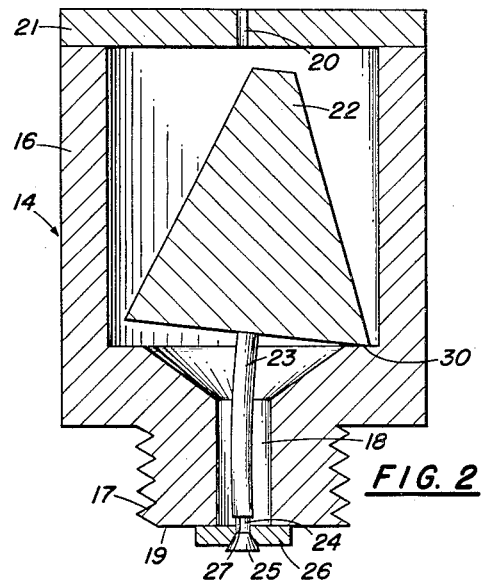
Fig. 2 is a sectional side view of the vent plug of the present invention showing the dual valve in fully closed position.

Referring to the drawing, Fig. 1 shows a multi-cell battery portion 10 with terminals 12 and cell connectors 13. A vent plug 14 is secured in each of the several cells 15. The cover of each cell 15 has a threaded portion (not shown) to receive the threads of the vent plug 14. The vent plug, Fig. 2, includes a shell portion 16 and a lower threaded portion 17 for attachment to the battery. The lower portion includes a gas escape passage 18 for gas generated within the battery and the bottom 19 constitutes a valve seat. The gas escape passage or vent 18 permits gas to move upwardly from the container or battery and through the orifice 20 in the usual shell cover 21 when the dual control valve is partially or fully open.

The control valve assembly comprises a weight 22, which may contain the known cut-out portions (not shown) to vent the gas, a flexible stem 23 secured to the weight and having a reduced portion 24 and a small end enlargement 25 which supports and lifts disc valve 26. This small end enlargement has a double function in that it constitutes a high pressure valve and also acts to lift the disc valve 26 to closed position.

The valve stem 23 and its enlargement 25 can be formed of acid resisting plastics, stainless steel, or combinations of plastic, hard rubber, stainless steel, neoprene and the like. It may, for example, have a stainless steel cable or other type flexible core, which forms the reduced portion, covered with firm neoprene or rubber to form the end enlargement and valve stem proper. The valve stem transmits the compressive force of the weight. The end enlargement 25 provides a high pressure valve which seats in the semi-hard or hard disc valve 26, which is of substantially greater area. A pivotal ball connection with the weight may be used instead of the flexible valve stem shown. The term "pivotally" as used herein includes the flexible valve stem illustrated.

The disc 26 is not distorted in operation and together with the enlargement 25 provides an effective liquid seal in closed position. The disc 26 and seat 19 similarly may provide a liquid seal. It is not necessary that either the disc or seat 19 be soft, but it is apparent that a rubber or other insert may be positioned in the hard seat surface 19 illustrated. Similarly the disc may be laminated as in Fig. 6 with at least one stiff ply to prevent flexing distortion of the disc during operation. From the above, it will be understood that there is herein provided a high pressure valve for partial opening of the vent and a low pressure disc valve operable to fully open the gas escape vent passage 18.

Figure 3:
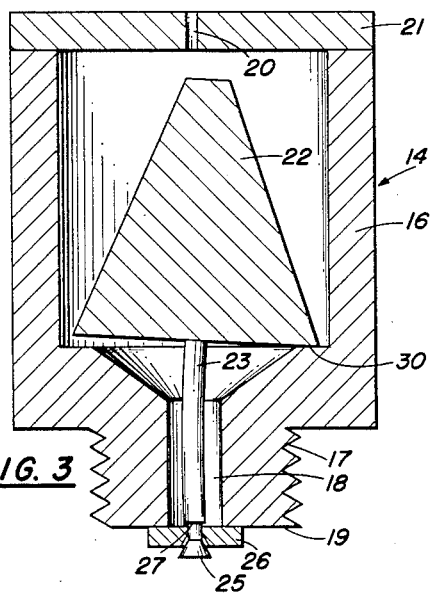
Fig. 3 shows the valve of the plug in an intermediate position in which the central high pressure valve portion is partly open.
Figure 4:
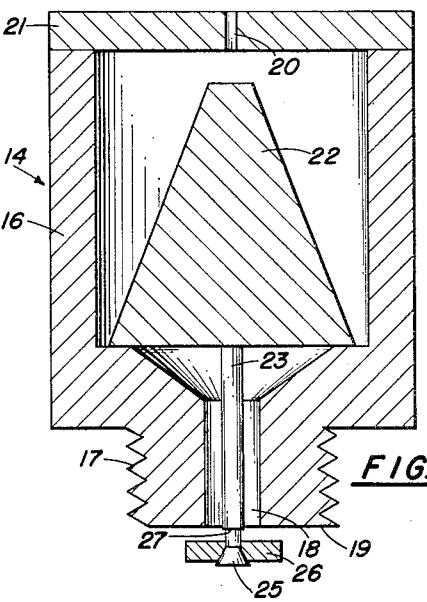
Fig. 4 shows the dual valve in fully open position.

Fig. 3 shows the weight, valve stem, and disc supporting portion 25 as they are returning to horizontal or stable position. The container or battery cell is being vented against high pressures which may be in excess of 60 cm. of mercury. The disc 26 is being forced up against the valve seat 19 by gas pressure. When the high pressure is sufficiently reduced, the disc 26 merely falls by gravity to rest on support 25, Fig. 4.

Figure 5:
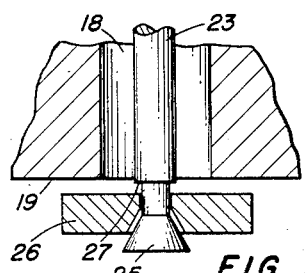
Fig. 5 shows the disc of the dual valve as it moves downwardly after separation from the valve seat.

Fig. 5 illustrates the disc 26 moving to its position of rest on support 25. The shoulder portion 27 of the valve stem 23 immediately above the reduced lost motion portion 24 rests on the disc 26 after completion of the movement of the weight to its normal position. This of course assists separation of the disc from the seat 19.

Figure 6:
Fig. 6 shows a laminated or reinforced disc valve portion.

One important feature of the present invention results from the use of a low pressure disc type valve of sufficient rigidity against flexing that it is not distorted in operation. The rigidity or semi-rigidity of the disc facilitates its being lifted to closed position by a relatively small high pressure central valve as described and the disc does not turn downwardly at the outer edge to either break the seal or to in effect form a single valve insofar as the opening operation is concerned. Also it does not become wedged in or cut by the inner edges of the valve seat. The disc may be constructed as shown in Fig. 6 wherein a rigid reinforcing lower portion 28 is secured to a softer upper disc portion 29. The surface of 29 seats on 19 and the high pressure valve 25, which may be somewhat yielding, seats in 28. Other forms of reinforcing for the disc may be used provided distortion is avoided. However, complex disc constructions are not essential to the concept.

In the main, the high pressure central valve should be as small as strength requirements permit and the enlargement may conveniently be the same size as the upper portion of the valve stem. It is preferred that the area of the high pressure valve exposed to container gas pressure in closed position be less than the area of the exposed portion of the low pressure disc valve in closed position. Also that the exposed area of the high pressure valve not exceed sixty percent of the area of the plug gas escape passage area. I consider twenty-five to fifty percent for the latter ratio to be most suitable considering strength, size, and other requirements for this type device. It may be noted that battery vent plugs are structurally small. A ¾ inch threaded portion and 1 inch diameter shell are typical dimensions. The height of the plug above the threaded portion is usually less than 1¾ inches and the smallest opening surrounding the valve stem, usually at the valve seat, is about 3/16 inch in diameter.

The operation of the plug will be understood from the above. Tilting of the container to a predetermined angle tilts the weight 22 about point 30 and lifts the high pressure valve and valve stem. The low pressure valve moves with the high pressure valve to closed position. When the weight returns to normal, the small enlargement gives a minimum of resistance to partial venting against high container pressures. This venting reduces the high pressure to a point where the low pressure valve opens. The rigidity of the low pressure valve makes this operation certain and has importantly contributed to greatly widening the operate range of this general type valve.

Having described my invention in a preferred embodiment but wishing to be limited only by the scope of the following, I claim:

1. An assembly including a container having a hard outer surface and a vent plug, said vent plug providing the sole venting means of the assembly and providing a central vent passage for gas and a bottom valve seat, said central vent passage being of uniform cross-section along its lower portion and providing an opening of the same uniform cross-section through and at right angles to the bottom valve seat, a vent control dual valve having a tiltable weight portion within the plug and a pivotable valve stem which is secured to the weight and passes through the vent passage, said valve stem extending below the valve seat and having a reduced portion spaced from but near its lower end, a circular disc valve of uniform cross-section surrounding a portion of the reduced portion and being supported from below by the valve stem and limited to movement axially of the valve stem by the length of the reduced portion, said disc having a central opening which is larger than the reduced portion so that the dual valve will be partially open when the disc is positioned above the supporting portion of the valve stem, said supporting portion being smaller in cross-section than the vent passage at the valve seat so that it will not press on the disc directly below the valve seat, and said disc being sufficiently rigid against flexing that its outer portion will maintain a seat on the valve seat when the weight is tilted and the valve is completely closed.

2. The combination of claim 1 further defined in that the disc is laminated with a stiff ply so that it does not flex to an appreciable extent under operating conditions involving gas pressures in excess of 50 cm. of mercury and the valve stem pivots by flexing.

3. A vent plug for a container, said vent plug providing a central vent passage for gas and a bottom valve seat, said central vent passage being of uniform cross-section along its lower portion and providing an opening of the same uniform cross-section through and at right angles to the bottom valve seat, a vent control dual valve having a tiltable weight portion within the plug and a pivotable valve stem which is secured to the weight and passes through the vent passage, said valve stem extending below the valve seat and having a reduced portion spaced from but near its lower end, a circular disc valve of uniform cross-section surrounding a portion of the reduced portion and being supported from below by the valve stem and limited to movement axially of the valve stem by the length of the reduced portion, said disc having a central opening which is larger than the reduced portion so that the dual valve will be partially open when the disc is positioned above the supporting portion of the valve stem, said supporting portion being smaller in cross-section than the vent passage at the valve seat so that it will not press on the disc directly below the valve seat, and said disc being sufficiently rigid against flexing that its outer portion will maintain a seat on the valve seat when the weight is tilted and the valve is completely closed.

4. The combination of claim 3 further defined in that the disc laminated with a stiff ply so that it does not flex under operating conditions involving gas pressure in excess of 50 cm. of mercury.

5. The combination of claim 3 further defined in that the cross-sectional area of the disc supporting portion of the valve stem does not exceed sixty percent of the total area of the portion of the gas escape passage which surrounds the valve stem at the valve seat.

6. The combination of claim 3 further defined in that the cross-sectional area of the disc supporting portion of the valve stem does not exceed sixty percent of the total area of the smallest portion of the gas escape passage which surrounds the valve stem above the valve seat and that the said supporting portion area is less than the exposed bottom area of the disc when the valve is in fully closed position.

7. The combination of claim 3 further defined in that the disc supporting portion of the valve stem is no larger in diameter than that portion of the valve stem which is above the reduced portion of the valve stem.

8. A vent plug for a container, said vent plug providing a central vent passage for gas and a bottom valve seat, said central vent passage being of uniform cross-section along its lower portion and providing an opening of the same uniform cross-section through and at right angles to the bottom valve seat, a vent control dual valve having a tiltable weight portion within the plug and a pivotable valve stem which is secured to the weight and passes through the vent passage, said valve stem extending below the valve seat and having a reduced portion spaced from but near its lower end, a circular disc valve of uniform cross-section surrounding a portion of the reduced portion and being supported from below by an enlargement of the valve stem and limited to movement axially of the valve stem by the length of the reduced portion, said disc having a central opening which is larger than said reduced portion so that the dual valve will be partially open when the disc adheres to the seat and the weight is not tilted, said enlargement of the valve stem forming a valve openable against relatively high pressures and said disc constituting a valve which may operate separately and against lower pressures and said disc being rigid against substantial flexing at its outer edges when the dual valve is completely closed and holding a gas pressure of 60 cm. of mercury.

9. The combination of claim 8 further defined in that the said enlargement and disc valve have mutual seating shapes and that the disc seat is not materially distorted by the seating action during operation.

References Cited in the file of this patent
UNITED STATES PATENTS
2,717,610   Gill ------------------ Sept. 13, 1955